United States Patent
Liu et al.

(10) Patent No.: US 9,503,881 B2
(45) Date of Patent: Nov. 22, 2016

(54) METHOD, DEVICE, AND SYSTEM FOR USER EQUIPMENT TO ACCESS EVOLVED PACKET CORE NETWORK

(71) Applicant: Huawei Technologies Co., Ltd., Shenzhen, Guangdong (CN)

(72) Inventors: Hai Liu, Shanghai (CN); Wenruo Zhu, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 14/167,737

(22) Filed: Jan. 29, 2014

(65) Prior Publication Data

US 2014/0146806 A1    May 29, 2014

Related U.S. Application Data

(63) Continuation of application No. PCT/CN2012/079633, filed on Aug. 3, 2012.

(30) Foreign Application Priority Data

Aug. 3, 2011    (CN) .......................... 2011 1 0221233

(51) Int. Cl.
*H04W 8/18*    (2009.01)
*H04W 8/04*    (2009.01)
(Continued)

(52) U.S. Cl.
CPC ................ *H04W 8/18* (2013.01); *H04W 8/04* (2013.01); *H04W 12/06* (2013.01); *H04W 84/12* (2013.01);
(Continued)

(58) Field of Classification Search
CPC ................... H04W 8/04; H04W 12/06; H04W 84/12; H04W 8/18; H04W 92/02;
(Continued)

(56) References Cited

U.S. PATENT DOCUMENTS 8,477,793 B2 *    7/2013    Tarra et al. ................... 370/401
2004/0103310 A1 *    5/2004    Sobel et al. .................. 713/201
(Continued)

FOREIGN PATENT DOCUMENTS

CN    101267656 A    9/2008
CN    101466084 A    6/2009
(Continued)

OTHER PUBLICATIONS

Naoe et al., "Mobile Communication System", Sep. 30, 2010, WO, WO 2010109902, machine translation.*
(Continued)

*Primary Examiner* — Pao Sinkantarakorn
*Assistant Examiner* — Michael Phillips
(74) *Attorney, Agent, or Firm* — Leydig, Voit & Mayer, Ltd.

(57) ABSTRACT

A method for a user equipment (UE) to access an evolved packet core (EPC) network includes: receiving, by an EPC access gateway connecting a wireless local area network (WLAN) to an EPC, a Dynamic Host Configuration Protocol (DHCP) request from the UE; and obtaining, by the EPC access gateway, subscription data of the UE according to a media access control MAC address of the UE in the DHCP request, and performing EPC access processing for the UE according to the obtained subscription data, where the obtaining subscription data of the UE according to a MAC address of the UE includes: obtaining the subscription data of the UE according to (a) the MAC address of the UE and (b) a matching MAC address of the UE the subscription data
(Continued)

of the UE that are correspondingly stored by a network device in an access authentication process.

15 Claims, 3 Drawing Sheets

(51) Int. Cl.
*H04W 12/06* (2009.01)
*H04W 84/12* (2009.01)
*H04W 88/16* (2009.01)
*H04W 92/02* (2009.01)
*H04L 29/06* (2006.01)
*H04L 29/12* (2006.01)

(52) U.S. Cl.
CPC ............ *H04W 88/16* (2013.01); *H04W 92/02* (2013.01); *H04L 61/2015* (2013.01); *H04L 63/0876* (2013.01); *H04L 63/0892* (2013.01)

(58) Field of Classification Search
CPC ................ H04W 88/16; H04L 61/2015; H04L 63/0876; H04L 63/0892
See application file for complete search history.

(56) References Cited

U.S. PATENT DOCUMENTS

| | | | | |
|---|---|---|---|---|
| 2004/0106433 | A1* | 6/2004 | Ooki | H04M 15/49 455/561 |
| 2006/0253703 | A1* | 11/2006 | Eronen | H04L 63/061 713/156 |
| 2007/0204048 | A1* | 8/2007 | Zhang | 709/227 |
| 2008/0026724 | A1* | 1/2008 | Zhang | H04L 63/08 455/411 |
| 2008/0165740 | A1* | 7/2008 | Bachmann | H04L 63/0272 370/332 |
| 2008/0254833 | A1* | 10/2008 | Keevill | H04L 12/5692 455/558 |
| 2008/0295154 | A1* | 11/2008 | Suh | H04W 12/06 726/4 |
| 2009/0052396 | A1* | 2/2009 | Bucker | H04W 36/0038 370/331 |
| 2009/0067417 | A1* | 3/2009 | Kalavade | H04L 12/66 370/356 |
| 2009/0129386 | A1* | 5/2009 | Rune | 370/392 |
| 2009/0186601 | A1* | 7/2009 | Hahn | H04L 63/08 455/411 |
| 2009/0303973 | A1* | 12/2009 | Patil | H04W 8/065 370/338 |
| 2010/0035578 | A1* | 2/2010 | Ahmed | 455/411 |
| 2011/0063997 | A1* | 3/2011 | Gras | H04W 92/02 370/254 |
| 2011/0182268 | A1* | 7/2011 | Akhtar | H04W 36/0022 370/331 |
| 2011/0216743 | A1* | 9/2011 | Bachmann | H04L 63/164 370/331 |
| 2011/0310799 | A1* | 12/2011 | Horn | H04W 76/02 370/328 |
| 2012/0084449 | A1* | 4/2012 | Delos Reyes | H04L 61/1511 709/229 |
| 2012/0196600 | A1* | 8/2012 | Mizukoshi | 455/435.1 |
| 2012/0246325 | A1* | 9/2012 | Pancorbo Marcos | H04L 12/2602 709/227 |
| 2013/0024915 | A1* | 1/2013 | Jones | H04W 12/06 726/5 |
| 2014/0044098 | A1* | 2/2014 | Roeland et al. | 370/331 |
| 2014/0101726 | A1* | 4/2014 | Gupta et al. | 726/4 |

FOREIGN PATENT DOCUMENTS

| | | |
|---|---|---|
| CN | 101778373 A | 7/2010 |
| CN | 102026194 A | 4/2011 |
| WO | 2010109902 * | 9/2010 |

OTHER PUBLICATIONS

"3GPP TS 23.402—3$^{rd}$ Generation Partnership Project; Technical Specification Group Services and System Aspects; Architecture enhancements for non-3GPP accesses (Release 10)," Version 10.4.0, 3$^{rd}$ Generation Partnership Project, Valbonne, France (Jun. 2011).

* cited by examiner

METHOD, DEVICE, AND SYSTEM FOR USER EQUIPMENT TO ACCESS EVOLVED PACKET CORE NETWORK

CROSS-REFERENCE TO RELATED APPLICATION

This application is a continuation of International Patent Application No. PCT/CN2012/079633, filed on Aug. 3, 2012, which claims priority to Chinese Patent Application No. 201110221233.0, filed on Aug. 3, 2011. The aforementioned patent applications are hereby incorporated by reference in their entireties.

TECHNICAL FIELD

The present invention relates to the field of wireless local area network (wireless local area network, WLAN) and evolved packet core (evolved packet core, EPC) convergence technologies, and in particular, to a method for a user equipment (User Equipment, UE) to access an EPC, an EPC access gateway, a WLAN authenticator (authenticator), an authentication, authorization and accounting (authentication authorization accounting, AAA) server/proxy, and a system for a UE to access an EPC.

BACKGROUND

At present, a WLAN deployed by an enterprise or an operator generally includes some access points (Access Point, AP) and one or more access point controllers (Access Point Controller, AC). The AP is used to collect user traffic, and the AC is used to manage the AP. Data traffic of the APs may aggregate on the AC or enter a switching network without being processed by the AC. An AC device produced by most device manufacturers is used only to perform AP management, user authentication, and charging by time, and does not support user data traffic aggregation.

Advances in communication technologies are accompanied by constant evolution and convergence of mobile communication networks. Accessing an EPC by a UE through a WLAN becomes a trend of evolution and convergence for the mobile communication networks.

An existing technology for a UE to access an EPC through a WLAN requires that a WLAN authenticator function, a Dynamic Host Configuration Protocol (dynamic host configuration protocol, DHCP) server function, and an EPC access function be integrated on one physical entity, for example, an AC, of the WLAN. Moreover, in an implementation process, dataflow of a UE goes through the AC, and is sent to a public data network (Public Data Network, PDN) gateway (PDN Gateway, PGW) after being aggregated on the AC.

It is possible that a device that has the authenticator function in the existing WLAN, such as the AC, has the DHCP server function but has neither the aggregation function nor the EPC access function. In order to implement these functions, not only processing capability of the device having the authenticator function in the WLAN needs to be improved to satisfy the convergence function, but an upgrade is required to provide the EPC access capability. This hinders reusing the device in the existing WLAN, resulting in a high upgrade cost of the WLAN when a UE accesses an EPC through the WLAN.

SUMMARY

A method for a UE to access an EPC, an EPC access gateway, a WLAN authenticator, an AAA server/proxy, and a system for a UE to access an EPC are provided, so as to reduce an upgrade cost of a WLAN when a UE in the WLAN accesses an EPC.

A method for a UE to access an EPC is provided, including:

receiving, by an EPC access gateway connecting a WLAN to the EPC, a DHCP request from the UE; and obtaining, by the EPC access gateway, subscription data of the UE according to a MAC address of the UE in the DHCP request, and performing EPC access processing for the UE according to the obtained subscription data;

where the obtaining subscription data of the UE according to a MAC address of the UE includes: obtaining the subscription data of the UE according to the media access control (Media Access Control, MAC) address of the UE and the MAC address of the UE and the subscription data of the UE that are correspondingly stored by a network device in an access authentication process.

An EPC access gateway connecting a WLAN to an EPC is provided, where the EPC access gateway includes:

a transceiving module, configured to receive a DHCP request from a UE, where the request includes a MAC address of the UE; and a processing module, configured to obtain subscription data of the UE according to the MAC address of the UE in the DHCP request received by the transceiving module, and the MAC address of the UE and the subscription data of the UE that are correspondingly stored by a network device in an access authentication process; and perform EPC access processing for the UE according to the obtained subscription data.

An AAA server/proxy device is provided, including:

a transceiving module, configured to receive a message including a MAC address of a UE from a WLAN authenticator, and a message including subscription data of the UE from a home subscriber server (Home Subscriber Server, HSS) in a UE access authentication process; receive a request message including the MAC address of the UE from an EPC access gateway; and send a feedback message generated, according to the request message, by a processing module to the EPC access gateway; and the processing module, configured to obtain the MAC address of the UE from the message received by the transceiving module from the WLAN authenticator; obtain the subscription data of the UE from the message received by the transceiving module from the HSS; correspondingly store the MAC address of the UE and the subscription data of the UE; and generate the feedback message including the subscription data of the UE according to the MAC address of the UE in the request message received by the transceiving module from the access gateway, and the correspondingly stored information.

A WLAN authenticator is provided, including:

a transceiving module, configured to receive a message including subscription data of a UE from an AAA server/proxy, and send a message generated by a processing module to an EPC access gateway; and the processing module, configured to obtain the subscription data of the UE from the message received by the transceiving module; correspondingly store the obtained subscription data of the UE and a MAC address of the UE; and generate the message including the MAC address of the UE and the subscription data of the UE.

A system for a UE to access an EPC is provided, including a WLAN authenticator, an AAA server/proxy, and the EPC access gateway described above.

In the solution provided above, an EPC access gateway is provided in a network where the gateway performs DHCP processing and EPC access processing for a UE, so that a device having an authenticator function in an existing WLAN does not need to be upgraded, and accessing by the UE in the WLAN to the EPC can be implemented, which facilitates reusing the device in the existing WLAN and reduces an upgrade cost of the WLAN.

DESCRIPTION OF EMBODIMENTS

To make the objectives, technical solutions and advantages of the present invention more comprehensible, the following further describes the present invention in detail with reference to the accompanying drawings.

Figure 1:
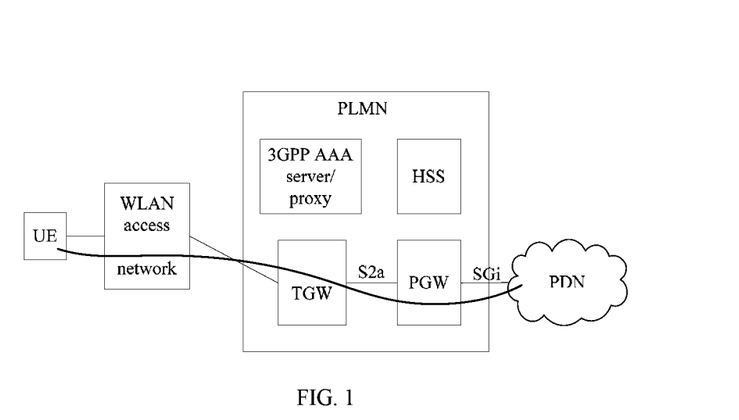
FIG. 1 is a diagram of possible system architecture according to an embodiment of the present invention.

FIG. 1 shows a diagram of possible architecture for a UE to access an EPC through a WLAN according to embodiments of the present invention; however, an actual implementation is not limited to the architecture. In FIG. 1, a trusted gateway (Trusted Gateway, TGW) device is added as an EPC access gateway on the basis of existing devices. The TGW has aggregation capability, an EPC access function (for example, supports a General Packet Radio Service Tunneling Protocol (General Packet Radio Service Tunneling Protocol, GTP) function, or supports a Proxy Mobile Internet Protocol (Proxy Mobile Internet Protocol, PMIP) function), and a DHCP server function. The TGW may further be provided with a firewall to separate the WLAN from the EPC. An S2a interface may be used as an interface between the TGW and a PGW. According to a protocol supported by the PGW, the interface may be implemented by using the GTP protocol or the PMIP protocol.

A WLAN is available in various scales. If too many small-scale WLANs are allowed to access an EPC directly from an AC therein, a large quantity of ACs may directly access the PGW, causing a management problem of the EPC. In addition, the WLAN may be a network constructed by a third party; if it is allowed to directly access the EPC, there is certain security risks. In the embodiments of the present invention, the TGW is provided to separate the WLAN from the EPC, where multiple WLANs may access the EPC through one TGW, which reduces management difficulty for the EPC; furthermore, the provision of the firewall on the TGW improves security for the EPC. Moreover, a one-to-many connection may be set for the TGW and the WLANs in the present invention, so as to reduce the number of TGWs, and reduce an overall technical implementation cost for the UE in the WLAN to access the EPC.

Figure 2:
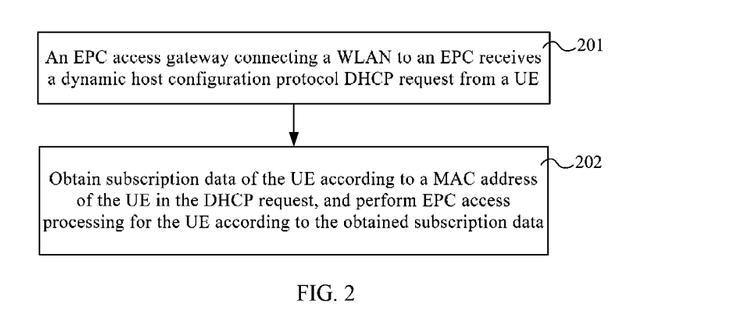
FIG. 2 is a flowchart of a method for accessing an EPC according to an embodiment of the present invention.

As shown in FIG. 2, a method for a UE to access an evolved packet core network EPC according to an embodiment of the present invention includes:

Step 201: An EPC access gateway connecting a WLAN to an EPC receives a DHCP request from a UE.

Specifically, in this step, the DHCP request sent by the UE is sent to an AP, and then the AP sends the DHCP request to the EPC access gateway. The AP may be directly connected to the EPC access gateway. Specifically, the AP may be connected to the EPC access gateway by using a layer-2 mode, for example, a virtual local area network (Virtual Local Area Network, VLAN) mode, or be connected to the EPC access gateway by using a layer-3 tunneling mode, for example, an Internet Protocol Security (Internet Protocol Security, IPSEC) tunneling mode. The AP may also not be directly connected to the EPC access gateway, where multiple APs in the WLAN are connected to a switch or a router in the WLAN, and the switch or router is connected to the EPC access gateway by using the layer-2 or layer-3 mode.

Step 202: Obtain subscription data of the UE according to a MAC address of the UE in the DHCP request, and perform EPC access processing for the UE according to the obtained subscription data.

In step 202, the obtaining subscription data of the UE according to a MAC address of the UE includes: obtaining the subscription data of the UE according to the MAC address of the UE and the MAC address of the UE and the subscription data of the UE that are correspondingly stored by a network device in an access authentication process.

In this embodiment, the network device that correspondingly stores the MAC address of the UE and the subscription data of the UE in the access authentication process may be the EPC access gateway; in such cases, the correspondingly storing, by the EPC access gateway, the MAC address of the UE and the subscription data of the UE may include:

receiving, by the EPC access gateway in the UE access authentication process, a message including the MAC address of the UE from a WLAN authenticator, and obtaining the MAC address of the UE from the message; and receiving a message including the subscription data of the UE from an AAA server/proxy, and obtaining the subscription data of the UE from the message; and correspondingly storing, by the EPC access gateway, the obtained MAC address of the UE and subscription data of the UE.

In this embodiment, the WLAN authenticator may be integrated on an AC of the WLAN.

The receiving the message from the AAA server/proxy and the receiving the message from the WLAN authenticator may be implemented by setting the EPC access gateway as a next hop of the WLAN authenticator in a domain routing table of the WLAN authenticator.

A domain routing table is generally in a format of a mapping relationship between a realm name and a corresponding next-hop node. For example, a destination realm name is an operator 1, and a corresponding next-hop Diameter node is a node 1.

In this embodiment, the network device that correspondingly stores the MAC address of the UE and the subscription data of the UE in the access authentication process may also be the AAA server/proxy; in such cases, the correspondingly storing, by the AAA server/proxy, the MAC address of the UE and the subscription data of the UE may include:

correspondingly storing, by the AAA server/proxy in the access authentication process, the MAC address of the UE in the message from the WLAN authenticator and the subscription data of the UE; and the obtaining subscription data of the UE according a MAC address of the UE in the DHCP request includes:

sending, by the EPC access gateway, a request message to the AAA server/proxy to request the subscription data of the UE that is stored in the AAA server/proxy, where the request message includes information about the MAC address of the UE in the DHCP request; and receiving, by the EPC access gateway, a message fed back by the AAA server/proxy, where the message includes the subscription data of the UE obtained by the AAA server/proxy according to the MAC address of the UE in the request message and information correspondingly stored therein; and obtaining, by the EPC access gateway, the subscription data of the UE from the message fed back.

In this embodiment, the network device that correspondingly stores the MAC address of the UE and the subscription data of the UE in the access authentication process may also be the WLAN authenticator; in such cases, the correspondingly storing, by the WLAN authenticator, the MAC address of the UE and the subscription data of the UE may include:

correspondingly storing, by the WLAN authenticator in the access authentication process, the subscription data of the UE in the message from the AAA server/proxy and the MAC address of the UE; and the obtaining subscription data of the UE according a MAC address of the UE in the DHCP request includes:

receiving, by the EPC access gateway, a message from the WLAN authenticator, where the message carries information correspondingly stored by the WLAN authenticator in the access authentication process; and obtaining, by the EPC access gateway, the subscription data of the UE according to the MAC address of the UE in the DHCP request and the correspondingly stored information carried in the message.

The EPC access processing for the UE includes: selecting, by the EPC access gateway, an APN for the UE according to the subscription data of the UE; further selecting, according to the APN, a public data network (Public Data Network, PDN) gateway (PDN Gateway, PGW) for accessing the EPC; and initiating a PDN connection establishment message to the PGW. If the PGW and the EPC access gateway support the GTP protocol, the PDN connection establishment message specifically is a create session request (create session request) message; if the PGW and the EPC access gateway support the PMIP protocol, the PDN connection establishment message specifically is a proxy binding update (proxy binding update) message. Then, the PGW returns a connection establishment response message, and carries an IP address assigned to the UE in the response message. The EPC access gateway, after receiving the response message, carries the IP address in a DHCP reply message to send to the UE through the AP.

The AAA server/proxy involved in this embodiment and other methods and device embodiments of the present invention may be an AAA server or an AAA proxy in a 3GPP protocol. If the UE is in a roaming state, that is, in a roaming scenario, it may specifically be a 3GPP AAA proxy; if the UE is not in a roaming state, that is, in a non-roaming scenario, it may specifically be a 3GPP AAA server.

In the foregoing embodiment, the EPC access gateway is provided in the network where the gateway performs DHCP processing and EPC access processing for the UE, so as to reduce an upgrade cost of the device having the authenticator function in the existing WLAN, which can also implement access to the EPC through the WLAN, thereby facilitating reusing the existing device in the WLAN, and reducing an upgrade cost of the WLAN.

Meanwhile, EPC access processing is performed by the EPC access gateway for the UE rather than the EPC access processing is performed by a device having the authenticator function in the WLAN, so that data of the UE aggregates on the EPC access gateway instead of aggregating on the device having the authenticator function, which also reduces an upgrade cost of the device having the authenticator function in the existing WLAN, that is, reduces the upgrade cost of the WLAN.

In an exemplary embodiment of the present invention, a TGW is configured as a next hop in a DIAMETER (a protocol evolved from RADIUS) or a remote authentication dial in user service (Remote Authentication Dial In User Service, RADIUS) routing table, that is, a domain routing table, of a WLAN authenticator (which may specifically be an AC, and the following description uses an AC as an example); in such cases, a DIAMETER message or a RADIUS message in an access authentication process all goes through the TGW, so that the TGW can store subscription data, and perform EPC access processing according to the subscription data.

Figure 3:
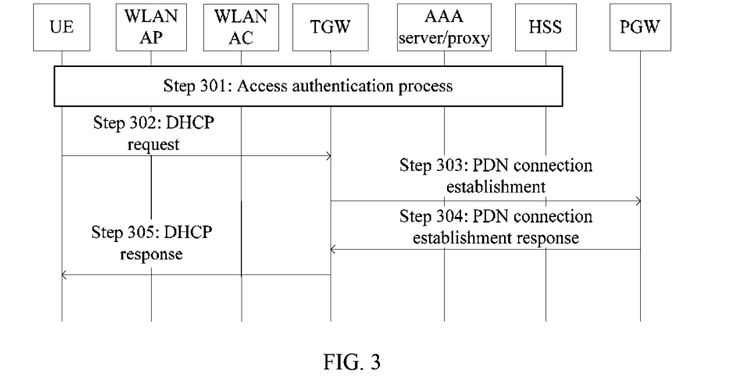
FIG. 3 is a flowchart of a method for accessing an EPC according to an exemplary embodiment of the present invention.

FIG. 3 shows a procedure in a process of specifically executing this embodiment. As shown in FIG. 3, this embodiment includes the following steps in the specific execution process:

Step 301: In an access authentication process, a TGW obtains subscription data of a UE and a MAC address of the UE, and correspondingly stores them.

A message interaction mode in the access authentication process is basically the same as an existing access authentication process, where a difference lies in that messages received and sent by an AC which is used as an authenticator all go through the TGW.

Specifically, in the access authentication process, the TGW, when receiving an access authentication and authorization request (Access Authentication and Authorization Request) message from the AC, obtains a UE layer-2 address (UE Layer-2 address) parameter from the message, and stores the parameter; that is, obtains and stores a MAC address of the UE.

The TGW, after receiving an access authentication and authorization response message (Access Authentication and Authorization Response) from the AAA server/proxy, obtains and stores the user subscription data in the message, where the user subscription data may include a default APN (Default APN), APN and PGW data (APN and PGW Data), a permanent user identity (Permanent User Identity), an aggregated maximum bit rate (Aggregated Maximum Bit Rate, AMBR) of the UE, and the like. The Default APN refers to a default APN which is generally selected by the TGW to establish a PDN connection. The APN and PGW Data includes a QoS parameter, all APNs that the user subscribes to, and PGW selection information corresponding to each APN, where the TGW selects a PGW according thereto. The Permanent User Identity may be an IMSI of the user. The AMBR of the UE is one of QoS parameters, where the TGW performs QoS control for the UE according to the QoS parameter in the APN and PGW Data and the AMBR of the UE.

Step 302: After the authentication succeeds, the UE sends a DHCP request message to a network side, and an AP sends the message to the TGW after receiving the message.

The DHCP request message carries the MAC address of the UE.

Step 303: The TGW, after receiving the DHCP request message, finds the subscription data of the UE according to the MAC address in the message and the data correspondingly stored in step 301; selects an APN for the UE according to the subscription data of the UE; further selects a PGW for accessing the EPC according to the APN; and then initiates a PDN connection establishment message to the PGW.

If the PGW supports the GTP protocol, the PDN connection establishment message specifically is a create session request (create session request) message; if the PGW supports the PMIP protocol, the PDN connection establishment message specifically is a proxy binding update (proxy binding update) message.

Step 304: The PGW returns a connection establishment response message, and carries an IP address assigned to the UE in the response message.

Corresponding to step 303, the connection establishment response message specifically may be a create session response (create session response) message in the GTP protocol, or a proxy binding acknowledge (proxy binding acknowledgement) message in the PMIP protocol.

Step 305: The TGW bears the IP address assigned to the UE in a DHCP reply message to send to the UE through the AP.

In this embodiment, the TGW is provided in the network, and the TGW is set as a next hop on the AC to make the messages in the access authentication process all go through the TGW, so that the TGW can obtain the subscription data of the UE and perform DHCP processing and EPC access processing for the UE according to the subscription data, so as to reduce an upgrade cost of the AC having the authenticator function in the existing WLAN, which can also implement access to the EPC through the WLAN, thereby facilitating reusing the existing device in the WLAN, and reducing an upgrade cost of the WLAN.

Meanwhile, EPC access processing is performed by the EPC access gateway for the UE rather than the EPC access processing is performed by a device having the authenticator function in the WLAN, so that data of the UE aggregates on the TGW instead of aggregating on the device having the authenticator function, which also reduces an upgrade cost of the device having the authenticator function in the existing WLAN, that is, reduces the upgrade cost of the WLAN.

In another exemplary embodiment of the present invention, without modifying a configuration on an AC, an AAA server/proxy correspondingly stores subscription data and a MAC address of UE, so that the AAA server/proxy may provide the subscription data of the UE for a TGW.

Figure 4:
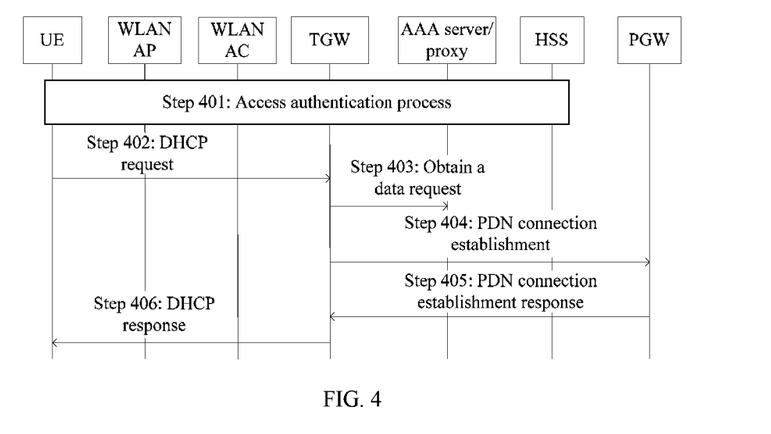
FIG. 4 is a flowchart of a method for accessing an EPC according to another exemplary embodiment of the present invention.

As shown in FIG. 4, this embodiment includes the following steps in a specific execution process:

Step 401: In an access authentication process for a UE, an AAA server/proxy obtains a MAC address of the UE and stores the MAC address of the UE corresponding to subscription data of a user.

Specifically, the MAC address is carried in a UE Layer-2 address parameter of an Access Authentication and Authorization Request sent by an authenticator to the AAA server/proxy; and the server/proxy stores the MAC address in the message after receiving the message.

The subscription data of the UE is carried in a Non-3GPP IP Access Registration response message sent by an HSS to the AAA server/proxy; and the AAA server/proxy, after receiving the message, obtains the subscription data of the UE and stores the subscription data corresponding to the MAC address of the UE.

Step 402: After the authentication succeeds, the UE sends a DHCP request message to a network side, where the DHCP request message carries the MAC address of the UE, and an AP sends the message to the TGW after receiving the message.

Step 403: The TGW, after receiving the DHCP request message, obtains the MAC address of the UE in the DHCP request message, and sends a retrieve subscription data (retrieve subscription data) message to the AAA server/proxy, where the message carries the MAC address of the UE; and the AAA server/proxy finds the subscription data of the UE according to a MAC address index of the UE and sends the subscription data of the UE to the TGW by using a retrieve subscription data response message.

In this step, a destination realm (destination realm) name in the retrieve subscription data message is a default destination realm name configured in the TGW, where the default destination realm name is a default AAA server/proxy realm name in an operator network to which the TGW belongs. The retrieve subscription data message can be routed according to the DIAMETER or RADIUS routing rule to the AAA server/proxy that stores the subscription data of the UE.

Step 404: The TGW obtains the subscription data of the UE; selects an APN for the UE according to the subscription data of the UE; further selects a PGW for accessing the EPC according to the APN; and then initiates a PDN connection establishment message to the PGW.

Following step 405 and step 406 are the same as steps 304 and 305 described above, and will not be described repeatedly herein.

In this embodiment, the TGW is provided in the network where the TGW performs DHCP processing and EPC access processing for the UE, so as to reduce an upgrade cost of the AC device having the authenticator function in the existing WLAN, which can also implement access to the EPC through the WLAN, thereby facilitating reusing the existing device, and reducing an upgrade cost of the WLAN.

Meanwhile, EPC access processing is performed by the EPC access gateway for the UE rather than the EPC access processing is performed by a device having the authenticator function in the WLAN, so that data of the UE aggregates on the TGW instead of aggregating on the device having the authenticator function, which also reduces an upgrade cost of the device having the authenticator function in the existing WLAN, that is, reduces the upgrade cost of the WLAN.

In a method according to another exemplary embodiment of the present invention, it is also allowed that in the access authentication process, the AC, after obtaining the subscription data, sends a message including the subscription data of the UE and the MAC address of the UE to the TGW; the TGW obtains the subscription data and MAC address of the UE from the message and stores them correspondingly; and the following procedure is the same as step 302 and the following procedure shown in FIG. 3. In such cases, the message sent by the AC to the TGW is a message newly added compared with the prior art.

In this embodiment, the message sent by the AC to the TGW may be sent in the access authentication process or be sent after the access authentication is ended.

In this embodiment, the TGW is provided in the network where the TGW performs DHCP processing and EPC access processing for the UE, so as to reduce an upgrade cost of the AC device having the authenticator function in the existing WLAN, which can also implement access to the EPC through the WLAN, thereby facilitating reusing the existing device, and reducing an upgrade cost of the WLAN.

Meanwhile, EPC access processing is performed by the EPC access gateway for the UE rather than the EPC access processing is performed by a device having the authenticator function in the WLAN, so that data of the UE aggregates on the TGW instead of aggregating on the device having the authenticator function, which also reduces an upgrade cost of the device having the authenticator function in the existing WLAN, that is, reduces the upgrade cost of the WLAN. A person of ordinary skill in the art may understand that all or a part of the steps of the foregoing method according to the embodiments may be implemented by a program instructing relevant hardware. The program may be stored in a computer readable storage medium. When the program is run, the content of the foregoing embodiments of the communication method based on the MIP technology of the present invention may be included. The storage medium mentioned herein may be a ROM/RAM, a magnetic disk, an optical disc, and so on.

Figure 5:
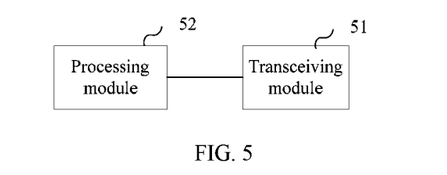
FIG. 5 is a schematic structural diagram of an EPC access gateway according to an embodiment of the present invention.

An embodiment of the present invention further provides an EPC access gateway, where the EPC access gateway connects a WLAN to an EPC. As shown in FIG. 5, the EPC access gateway includes:

a transceiving module 51, configured to receive a DHCP request from a UE, where the request includes a MAC address of the UE; and a processing module 52, configured to obtain subscription data of the UE according to the MAC address of the UE in the DHCP request received by the receiving module 51, and perform EPC access processing for the UE according to the determined subscription data;

where the obtaining subscription data of the UE according to the MAC address of the UE includes: obtaining the subscription data of the UE according to the MAC address of the UE and the MAC address of the UE and the subscription data of the UE that are correspondingly stored by a network device in an access authentication process.

In an exemplary embodiment, the transceiving module 51 may be further configured to receive a message including the MAC address of the UE from a WLAN authentication initiator in the UE access authentication process, and receive a message including the subscription data of the UE from an AAA server/proxy.

The processing module 52 may be further configured to obtain the MAC address of the UE and the subscription data of the UE from the messages received by the transceiving module 51, and store them correspondingly.

In another exemplary embodiment, the transceiving module 51 may also be further configured to send a request message to the AAA server/proxy, and receive a message fed back by the AAA server/proxy.

The processing module 52 is further configured to obtain the MAC address of the UE in the DHCP request received by the transceiving module, and generate the request message sent to the AAA server/proxy, where the generated request message includes the MAC address in the DHCP request; and obtain the subscription data of the UE from the message fed back by the AAA server/proxy and perform EPC access processing for the UE according to the obtained subscription data, where the message fed back by the AAA server/proxy includes the subscription data determined by the AAA server/proxy according to the subscription data of the UE and the MAC address of the UE that are correspondingly stored in the access authentication process, and the MAC address of the UE in the request message.

In still another exemplary embodiment, the transceiving module 51 may be further configured to receive a message from the WLAN authenticator.

The processing module 52 is further configured to obtain the subscription data of the UE according to the MAC address of the UE in the DHCP request received by the transceiving module, and the MAC address of the UE and the subscription data of the UE that are carried in the message received by the transceiving module from the WLAN authenticator, where the MAC address of the UE and the subscription data of the UE that are carried in the message are information stored by the WLAN authenticator in the access authentication process; and perform EPC access processing for the UE according to the obtained subscription data.

In the foregoing embodiments of the EPC access gateway, the EPC access gateway is provided in the network where the gateway performs DHCP processing and EPC access processing for the UE, so as to reduce an upgrade cost of the device having the authenticator function in the existing WLAN, which can also implement access to the EPC through the WLAN, thereby facilitating reusing the existing device in the WLAN, and reducing an upgrade cost of the WLAN.

Meanwhile, EPC access processing is performed by the EPC access gateway for the UE rather than the EPC access processing is performed by a device having the authenticator function in the WLAN, so that data of the UE aggregates on the EPC access gateway instead of aggregating on the device having the authenticator function, which also reduces an upgrade cost of the device having the authenticator function in the existing WLAN, that is, reduces the upgrade cost of the WLAN.

Figure 6:
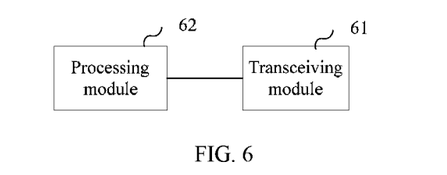
FIG. 6 is a schematic structural diagram of an AAA server/proxy according to an embodiment of the present invention.

An embodiment of the present invention further provides an AAA server/proxy device. As shown in FIG. 6, the AAA server/proxy device includes:

a transceiving module 61, configured to receive a message including a MAC address of a UE from a WLAN authenticator in a UE access authentication process, and a message including subscription data of the UE from an HSS; receive a request message including the MAC address of the UE from an EPC access gateway; and send a feedback message generated, according to the request message, by a processing module to the EPC access gateway; and the processing module 62, configured to obtain the MAC address of the UE from the message received by the transceiving module from the WLAN authenticator; obtain the subscription data of the UE from the message received by the transceiving module from the HSS; correspondingly store the MAC address of the UE and the subscription data of the UE; and generate the feedback message including the subscription data of the UE according to the MAC address of the UE in the request message received by the transceiving module from the EPC access gateway and the correspondingly stored information.

In this embodiment, the AAA server/proxy stores the mapping relationship between the MAC address of the UE and the subscription data of the UE, and provides the subscription data of the UE corresponding to the MAC address of the UE for the EPC access gateway, so that the EPC access gateway can perform EPC access processing for the UE according to the subscription data of the UE, which reduces an upgrade cost of the AC device having the authenticator function in the existing WLAN, and can also implement access to the EPC through the WLAN, thereby facilitating reusing the existing device, and reducing an upgrade cost of the WLAN.

Figure 7:
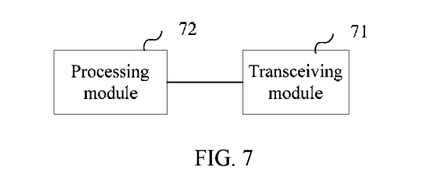
FIG. 7 is a schematic structural diagram of a WLAN authenticator according to an embodiment of the present invention.

An embodiment of the present invention further provides a WLAN authenticator. As shown in FIG. 7, the WLAN authenticator includes:

a transceiving module 71, configured to receive a message including subscription data of a UE from an AAA server/proxy, and send a message generated by a processing module to an EPC access gateway; and the processing module 72, configured to obtain the subscription data of the UE from the message received by the transceiving module and store the subscription data of the UE; correspondingly store the subscription data of the UE and a MAC address of the UE; and generate a message including the MAC address of the UE and the subscription data of the UE.

In this embodiment, the WLAN authenticator stores the mapping relationship between the MAC address of the UE and the subscription data of the UE, and provides the subscription data of the UE corresponding to the MAC address of the UE for the EPC access gateway, so that the EPC access gateway can perform EPC access processing for the UE according to the subscription data of the UE, which reduces an upgrade cost of the AC device having the authenticator function in the existing WLAN, and can also implement access to the EPC through the WLAN, thereby facilitating reusing the existing device, and reducing an upgrade cost of the WLAN.

Figure 8:
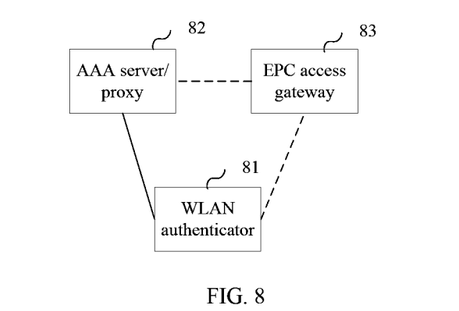
FIG. 8 is a schematic structural diagram of a system for a UE to access an EPC according to an embodiment of the present invention.

An embodiment of the present invention further provides a system for a UE to access an EPC. As shown in FIG. 8, the system includes a WLAN authenticator 81, an AAA server/proxy 82, and an EPC access gateway 83. For a specific implementation of the system, refer to the method embodiments described above, which will not be described repeatedly herein. A dashed line in FIG. 8 indicates that there is a connection relationship between two network devices connected by using the dashed line in some embodiments, but no connection relationship exists in some other embodiments.

The WLAN authenticator 81 is a device in the WLAN access network shown in FIG. 1, which may specifically be an AC. The AAA server/proxy 82 may be a 3GPP AAA server/proxy shown in FIG. 1. The EPC access gateway 83 may be a TGW shown in FIG. 1.

In the system for a UE to access an EPC according to the embodiment, the EPC access gateway is provided in the network where the gateway performs DHCP processing and EPC access processing for the UE, so as to reduce an upgrade cost of the device having the authenticator function in the existing WLAN, which can also implement access to the EPC through the WLAN, thereby facilitating reusing the existing device in the WLAN, and reducing an upgrade cost of the WLAN.

Meanwhile, EPC access processing is performed by the EPC access gateway for the UE rather than the EPC access processing is performed by a device having the authenticator function in the WLAN, so that data of the UE aggregates on the EPC access gateway instead of aggregating on the device having the authenticator function, which also reduces an upgrade cost of the device having the authenticator function in the existing WLAN, that is, reduces the upgrade cost of the WLAN.

The present invention is illustrated and described with reference to some exemplary embodiments of the present invention. However, a person of ordinary skill in the art should understand that various alterations may be made, in form and details, to the present invention without departing from the spirit and scope of the present invention.

What is claimed is:

1. A method for a user equipment (UE), connected to a wireless local area network (WLAN), to access an evolved packet core (EPC) network, comprising:

receiving, by an EPC access gateway connecting the WLAN to the EPC network, a Dynamic Host Configuration Protocol (DHCP) request from the UE carrying a media access control (MAC) address of the UE;

obtaining, by the EPC access gateway, subscription data of the UE from an Authentication, Authorization and Accounting (AAA) server/proxy or a WLAN authenticator according to the MAC address of the UE in the DHCP request, wherein the AAA server/proxy is included in the EPC network and the WLAN authenticator is included in the WLAN;

selecting, by the EPC access gateway, an Access Point Name (APN) for the UE based on the obtained subscription data of the UE;

selecting, by the EPC access gateway, a public data network (PDN) gateway (PGW) for the UE accessing the EPC network based on the selected APN, wherein the PGW is included in the EPC network and is communicatively coupled to the PDN; and performing, by the EPC access gateway, EPC access processing for the UE according to the selected PGW, wherein access processing includes aggregation of data of the UE.

2. The method according to claim 1, wherein the obtaining subscription data of the UE according to the MAC address of the UE comprises: obtaining the subscription data of the UE according to (a) the MAC address of the UE carried in the DHCP request, and (b) a matching MAC address of the UE and the subscription data of the UE that are correspondingly stored by a network device in an access authentication process.

3. The method according to claim 2, wherein correspondingly storing, by the network device, the matching MAC address of the UE and the subscription data of the UE in the access authentication process comprises:

receiving, by the EPC access gateway in the UE access authentication process, a message comprising the matching MAC address of the UE from the WLAN authenticator, and obtaining the matching MAC address of the UE from the message received from the WLAN authenticator; and receiving a message comprising the subscription data of the UE from the AAA server/proxy, and obtaining the subscription data of the UE from the message received from the AAA server/proxy; and correspondingly storing, by the EPC access gateway, the obtained matching MAC address of the UE and subscription data of the UE.

4. The method according to claim 3, wherein the method further comprises:

setting the EPC access gateway as a next hop of the WLAN authenticator in a domain routing table of the WLAN authenticator; and wherein the receiving, by the EPC access gateway in the UE access authentication process, the message comprising the matching MAC address of the UE from the WLAN authenticator comprises: in the access authentication process, receiving, by the EPC access gateway, a message sent based on the domain routing table by the WLAN authenticator.

5. The method according to claim 1, wherein
the obtaining the subscription data of the UE according to the MAC address of the UE in the DHCP request comprises:
sending, by the EPC access gateway, a request message to the AAA server/proxy to request the subscription data of the UE that is stored in the AAA server/proxy, wherein the request message comprises information about the MAC address of the UE in the DHCP request;
receiving, by the EPC access gateway, a message fed back by the AAA server/proxy, wherein the message comprises the subscription data of the UE obtained by the AAA server/proxy according to the MAC address of the UE in the request message and information correspondingly stored by the AAA server/proxy; and
obtaining, by the EPC access gateway, the subscription data of the UE from the message fed back.

6. The method according to claim 1, wherein the obtaining subscription data of the UE according to a MAC address of the UE in the DHCP request comprises:
receiving, by the EPC access gateway, a message from a WLAN authenticator, wherein the message carries the MAC address of the UE and the subscription data of the UE that are correspondingly stored by the WLAN authenticator; and
obtaining the subscription data of the UE according to the MAC address of the UE in the DHCP request and the correspondingly stored information carried in the message.

7. An evolved packet core (EPC) access gateway, wherein the EPC access gateway connects a wireless local area network (WLAN) to an EPC, and the EPC access gateway comprises:
a transceiver, configured to receive a Dynamic Host Configuration Protocol (DHCP) request from a user equipment (UE), wherein the request comprises a MAC address of the UE and the UE is connected to the wireless local area network (WLAN); and
a processor, configured to:
obtain subscription data of the UE from an Authentication, Authorization and Accounting (AAA) server/proxy or a WLAN authenticator according to the MAC address of the UE in the DHCP request received by the transceiver, wherein the AAA server/proxy is included in the EPC network and the WLAN authenticator is included in the WLAN;
select, an Access Point Name (APN) for the UE based on the obtained subscription data of the UE;
select, a public data network (PDN) gateway (PGW) for the UE accessing the EPC network based on the selected APN; and
perform EPC access processing for the UE according to the selected PGW, wherein access processing includes aggregation of data of the UE.

8. The access gateway according to claim 7, wherein a matching MAC address of the UE and the subscription data of the UE that are correspondingly stored by a network device in an UE access authentication process.

9. The access gateway according to claim 8, wherein the transceiver is further configured to receive a message comprising the matching MAC address of the UE from the WLAN authenticator in the UE access authentication process, and receive a message comprising the subscription data of the UE from the AAA server/proxy; and
the processor is further configured to obtain the matching MAC address of the UE and the subscription data of the UE from the messages received by the transceiver, and store them correspondingly.

10. The access gateway according to claim 7, wherein the transceiver is further configured to
send a request message to the AAA server/proxy, and receive a message fed back by the AAA server/proxy; and
the processor is configured to
obtain the MAC address of the UE in the DHCP request received by the transceiver;
generate the request message sent to the AAA server/proxy, wherein the generated request message comprises the MAC address of the UE carried in the DHCP request; and
obtain the subscription data of the UE from the message fed back by the AAA server/proxy and perform EPC access processing for the UE according to the obtained subscription data,
wherein the message fed back by the AAA server/proxy comprises the subscription data determined by the AAA server/proxy according to the subscription data of the UE and a matching MAC address of the UE that are correspondingly stored in the access authentication process, and the MAC address of the UE in the DHCP request message.

11. The access gateway according to claim 7, wherein the transceiver is further configured to receive a message from the WLAN authenticator; and
the processor is configured to obtain the subscription data of the UE according to the MAC address of the UE in the DHCP request received by the transceiver and a matching MAC address of the UE and the subscription data of the UE that are carried in the message received by the transceiver from the WLAN authenticator, wherein the matching MAC address of the UE and the subscription data of the UE that are carried in the message are information stored by the WLAN authenticator in the access authentication process; and perform EPC access processing for the UE according to the obtained subscription data.

12. An Authentication, Authorization and Accounting (AAA) server/proxy device, comprising:
a transceiver, configured to
receive a message comprising a matching media access control (MAC) address of a user equipment (UE) from a wireless local area network (WLAN) authenticator, wherein the UE is communicatively coupled to the WLAN authenticator, and a message comprising subscription data of the UE from a Home Subscriber Server (HSS) in a UE access authentication process; wherein the HSS is included in the EPC network;
receive a request message comprising a MAC address of the UE from an evolved packet core (EPC) access gateway; wherein the EPC access gateway connects the WLAN authenticator to the EPC network; and
send a feedback message generated according to the request message by a processer to the EPC access gateway; and
the processor, configured to
obtain the matching MAC address of the UE from the message received by the transceiver from the WLAN authenticator;
obtain the subscription data of the UE from the message received by the transceiver from the HSS;
correspondingly store the matching MAC address of the UE and the subscription data of the UE; and generate the feedback message comprising the subscription data of the UE according to the MAC address of the UE in the request message received by the transceiver from the EPC access gateway, and the correspondingly stored information, such that the WLAN authenticator does not perform access processing and the EPC access gateway performs access processing for the UE according to the subscription of the UE, wherein access processing includes aggregation of data of the UE.

13. The AAA server/proxy device according to claim 12, wherein the EPC access gateway is set as a next hop of the WLAN authenticator in a domain routing table of the WLAN authenticator.

14. A wireless local area network (WLAN) authenticator, comprising:

a transceiver, configured to receive a message comprising subscription data of a user equipment (UE) from an Authentication, Authorization and Accounting (AAA) server/proxy, and send a message generated by a processor to an evolved packet core (EPC) access gateway, wherein the UE is communicatively coupled to the WLAN authenticator and the EPC access gateway connects the WLAN authenticator to the EPC network; and the processer, configured to obtain the subscription data of the UE from the message received by the transceiver; correspondingly store the obtained subscription data of the UE and a matching media access control (MAC) address of the UE; and generate the message comprising the matching MAC address of the UE and the subscription data of the UE, wherein the WLAN authenticator does not perform access processing and the EPC access gateway performs access processing for the UE according to the subscription of the UE, wherein access processing includes aggregation of data of the UE.

15. The WLAN authenticator according to claim 14, wherein the EPC access gateway is set as a next hop of the WLAN authenticator in a domain routing table of the WLAN authenticator.

* * * * *